United States Patent [19]

Wilson et al.

[11] Patent Number: 4,999,174

[45] Date of Patent: Mar. 12, 1991

[54] USE OF CERIUM OXIDE FOR REMOVAL OF CHLORINE FROM FUEL GASES

[75] Inventors: William G. Wilson, Pittsburgh, Pa.; D. Alan R. Kay, Burlington, Canada

[73] Assignee: Gas Desulfurization Corporation, Pittsburgh, Pa.

[21] Appl. No.: 542,103

[22] Filed: Jun. 22, 1990

[51] Int. Cl.$^5$ .............................................. B01D 53/34
[52] U.S. Cl. .................................... 423/241; 423/230; 423/244; 423/263
[58] Field of Search ................... 423/241, 263, 244 R, 423/230

[56] References Cited

U.S. PATENT DOCUMENTS

| | | | |
|---|---|---|---|
| 4,507,149 | 3/1985 | Kay et al. | 423/230 |
| 4,604,268 | 8/1986 | Kay et al. | 423/230 |
| 4,714,598 | 12/1987 | Kay et al. | 423/230 |
| 4,826,664 | 5/1989 | Kay et al. | 423/263 |
| 4,857,280 | 8/1989 | Kay et al. | 423/263 |
| 4,857,296 | 8/1989 | Brunelle et al. | 423/263 |
| 4,885,145 | 12/1989 | Kay et al. | 423/230 |

OTHER PUBLICATIONS

Chemical Abstracts: 149284e, vol. 80, 1973.

*Primary Examiner*—Jeffrey E. Russel
*Assistant Examiner*—Brian M. Bolam
*Attorney, Agent, or Firm*—Buchanan Ingersoll; Michael L. Dever

[57] ABSTRACT

A process for the removal of chlorine from reducing gases is provided wherein the reducing gases are contacted with cerium oxide. The chlorided cerium oxide is regenerated in an oxidizing atmosphere to provide cerium oxide. This cerium oxide regenerated is again capable of reacting with chlorine in reducing gases.

7 Claims, No Drawings

USE OF CERIUM OXIDE FOR REMOVAL OF CHLORINE FROM FUEL GASES

BACKGROUND OF THE INVENTION

1. Field of the Invention

This invention relates to the use of cerium oxide ($CeO_2$) for the removal of chlorine ($Cl_2$) from reducing gases. The cerium chloride ($CeCl_3$) generated by the reaction of the $Cl_2$ with $CeO_2$ can be regenerated back to $CeO_2$ by exposure to an oxidizing atmosphere such as air with the release of $Cl_2$.

2. Description of the Prior Art

For purposes of illustration the removal of chlorine from fuel gases generated in a gasifier from hydrocarbons which also contain either $Cl_2$ or compounds which contain chlorine that dissociate with the release of $Cl_2$ will be used. Many of the hydrocarbons that may be used for the creation of fuel gases also contain sulfur which is found in the fuel gas mainly in the form of hydrogen sulfide ($H_2S$) or carbon oxysulfide (COS). Patents currently exist for the removal of sulfur from fuel gases with cerium oxide and doped cerium oxide, and thermodynamic calculations indicate that the removal of $H_2S$, COS, and $Cl_2$ can occur simultaneously. However, the use of fuel gases produced from hydrocarbons containing both sulfur and chlorine for illustrative purposes does not preclude the use of the technology for the reduction of $Cl_2$ from other reducing gases containing $Cl_2$ no matter what their method of preparation or production.

One of the major applications of the technology may be the removal of $Cl_2$ from the fuel gases used in integrated-gasifier-combined cycle (IGCC) power plants which may become the preferred method of electric power generation in the future. The gasifiers of IGCC systems may operate at temperatures as high as 2800° F. Undesirable components of the fuel gases produced in the gasifier may be removed by lowering the temperature of the fuel gases to a temperature either slightly above or slightly below the boiling point of water by methods known to those skilled in the art and then exposing the fuel gases to chemicals and water solutions of chemicals capable of removing the undesirable components such as $Cl_2$ and $H_2S$ from the gases. Because of the almost complète loss of the sensible heat from the gases, the cost of electricity (COE) of power plants which utilize this technology for removal of undesirable components from the fuel gases produced by gasifiers has been computed to be about 10% higher than the cost of IGCC systems that could remove the undesirable components such as $H_2S$ and $Cl_2$ at high temperatures. Although methods have been developed which operate at close to the operating temperature of the gasifier for removing $H_2S$ from fuel gases by exposing them to materials such as zinc ferrite, zinc titanate, copper-manganese oxide mixtures, and cerium oxide, an extensive literature review reveals no studies of methods for the use 9f solid sorbents to remove $Cl_2$ from fuel gases.

Data available on the analysis of coals produced in Illinois show that the chlorine content of those coals can range from 0.02% to 0.42% with the average being 0.112%. The sulfur content of these same coals ranges from 1.14% to 4.52% with the average being 3.31%. When such coals are used in an oxygen blown gasifier the $H_2S$ content of the resulting gases based on their average sulfur content would be about 1.00%. If all of the chlorine in the coal is converted to $Cl_2$, the $Cl_2$ content of the fuel gases produced from the coal whose chlorine content is 0.42% could be as high as 0.10% or 1000 ppm.

In an IGCC system the fuel gases from the gasifier are fired into a gas turbine, and it is recognized that the blades in a gas turbine may operate at temperatures as high as 2000° F. (1093.3° C.). When the temperature of the blades in a gas turbine approaches 2000° F. in the oxidizing atmosphere created by burning the fuel gases, the blades may be partially oxidized. As a result of this oxidation there is a film of oxide coating the blades. The oxides on turbine blades are in many cases either high in $Al_2O_3$ or $Cr_2O_3$ because many turbine blade alloys contain aluminum and chromium.

TABLE I

SUMMARY OF MELTING POINT AND VAPOR PRESSURE

| | Fluorides | | Chlorides | | Oxides | |
|---|---|---|---|---|---|---|
| | mp | tv | mp | tv | | mp |
| $FeX_2$ | 1020 | 906 | 676 | 536 | FeO | 1378 |
| $FeX_3$ | 1027 | 673 | 303 | 167 | $Fe_2O_3$ | 1594 |
| $NiX_2$ | 1450 | 939 | 1030 | 607 | NiO | 1955 |
| $CoX_2$ | 1250 | 962 | 740 | 587 | CoO | 1805 |
| $CrX_2$ | 894 | 928 | 820 | 741 | | |
| $CrX_3$ | 1404 | 855 | 1150 | 611 | $Cr_2O_3$ | 2400 |
| $AlX_3$ | 1273 | 825 | 193 | 67 | $Al_2O_3$ | 2050 | mp = melting point (°C.)
tv = temperature at which v.p = $10^{-4}$ atmospheres

The data in Table I shows that all of the chlorides of the major constituents of turbine blades have substantial vapor pressures at temperatures less than the operating temperatures expected in many gas turbines with $AlCl_3$ having a very low melting point and a very high vapor pressure. As a result, there will be a continuous vaporization of the chlorides formed from the oxides created on the turbine blades when the fuel gases contain $Cl_2$. This will result in premature failure of the turbine blades.

A need therefore exists for a method for removing chlorine from fuel gases produced from coals containing chlorine containing compounds or chlorine itself.

SUMMARY OF THE INVENTION

One object of the present invention is to provide a method for removing chlorine from fuel gases created from hydrocarbons containing chlorine or chlorine bearing compounds in a gasifier which contain little or no sulfur either as $H_2S$ or COS. The chlorine content of resulting gases is reduced to a level sufficiently low that the expected life of gas turbine blades may be achieved.

Another object of the present invention is to provide a method for the simultaneous removal of hydrogen sulfide ($H_2S$), carbon oxysulfide (COS) and chlorine ($Cl_2$) from fuel gases created from hydrocarbons containing sulfur and sulfur containing compounds and chlorine and chlorine containing compounds to a level sufficiently low that the expected life of the gas turbine blades may be achieved.

Briefly, these objects can be achieved by exposing fuel gases containing $Cl_2$ alone or fuel gases containing sulfur compounds such as $H_2S$ and COS and $Cl_2$ to cerium oxide whereby the $Cl_2$ content of the gases will be reduced to a level sufficiently low that the expected life of the gas turbine blades may be achieved. The sulfur content of the gases is also reduced to a level sufficiently low to meet present and future requirements of the Environmental Protection Agency (EPA) for sulfur emissions.

DESCRIPTION OF THE PREFERRED EMBODIMENTS

The preferred embodiments of the invention may be explained using thermodynamic calculations which predict the extent of capture of $Cl_2$ with $CeO_2$ both when there is no sulfur present and when there is sulfur present in the gases.

The first embodiment is the removal of $Cl_2$ from reducing gases when there is no sulfur present.

Two of the equations related to the removal of chlorine from fuel gases are:

$$Ce(s) + O_2(g) = CeO_2(s) \tag{1}$$

and $$Ce(s) + 3/2 Cl_2(g) = CeCl_3(g) \tag{2}$$

When the two equations are combined and the terms rearranged the equation for the reaction of $CeO_2$ and $2Cl_2$ can be written:

$$CeO_2(s) + 3/2 Cl_2 = CeCl_3(s) + O_2(g) \tag{3}$$

The equilibrium constant "K" for this equation can be written:

$$K = ((a)CeCl_3 \times pO_2)/((a)CeO_2 \times [pCl_2]^{3/2}) \tag{4}$$

Since $CeCl_3$ and $CeO_2$ are solids their activity (a) is one. The equation can be rewritten as:

$$K = pO_2/(pCl_2)^{3/2} \tag{5}$$

From the thermodynamic data available for the equations (1), (2) and (3) the equilibrium constant "K" can be calculated to be $9.74 \times 10^{-4}$ at a temperature of 1273° K. (1000° C.) [1832° F.], and equation (5) can be rewritten as:

$$9.74 \times 10^{-4} = pO_2/(pCL_2)^{3/2} \tag{6}$$

When the $pO_2$ ($3.697 \times 10^{-17}$) in equilibrium with a gas from a Prenflo gasifier (assuming no sulfur in the gas) is substituted in equation (6) the $pCl_2$ can be calculated to be $7.129 \times 10^{-9}$, virtually complete elimination of all $Cl_2$ from the fuel gas.

In the same manner when the $pO_2$ ($1.579 \times 10^{-14}$) in equilibrium with a fuel gas from a KRW gasifier (assuming no sulfur in the gas) is substituted in equation (6) the $pCl_2$ can be calculated to be $6.454 \times 10^{-8}$, again virtually complete elimination of the chlorine.

From these computations it can be seen that the thermodynamic calculations predict virtual elimination of chlorine from fuel gases produced from the most efficient and the least efficient gasifiers.

The effect of temperature and gas composition on the removal of chlorine from reducing gases is illustrated in Table II.

TABLE II

| Temperature | Prenflo Gas | KRW Gas |
|---|---|---|
| 1881° F. | $1.025 \times 10^{-9}$ | $5.866 \times 10^{-8}$ |
| 1521° F. | $8.212 \times 10^{-12}$ | $5.676 \times 10^{-10}$ |
| 981° F. | $2.858 \times 10^{-8}$ | $1.370 \times 10^{-15}$ |

It is also to be noted that the melting point of $CeCl_3$ is 848° C. (1558° F.) and its boiling point is 1727° C. (3141° F.).

The ability to regenerate any $CeCl_3$ formed may be assessed by the partial pressure of chlorine when the regenerating medium is air whose $pO_2$ is 0.21. Computations based on equation (6) at 1273° K. (1832° F.) show that under those conditions the partial pressure of $Cl_2$ is 111.9 atmospheres which should assure complete regeneration of any $CeCl_3$ formed by exposure of $CeO_2$ to chlorine containing fuel gases.

Likewise, thermodynamic calculations can be utilized to predict the extent of $Cl_2$ removal from fuel gases which contain sulfur.

During desulfurization and dechlorination of a fuel gas, two competing reactions may take place:

$$2CeO_2(s) + \tfrac{1}{2} S_2(g) = Ce_2O_2S(S) + O_2(g) \tag{7}$$

and $$CeO_2(s) + 3/2 Cl_2(g) = CeCl_3(s) + O_2(g) \tag{8}$$

At 1300° K. (1700° F.) the equilibrium constant "K" for equations (7) and (8) can be calculated. It is also to be noted that both equations (7) and (8) contain a term for $pO_2$. Since the reactions take place together, the $pO_2$ content in both equations (7) and (8) is the same. Therefore, three additional equations can be written:

$$pO_2(g) = K_7(pS_2)^{\tfrac{1}{2}} \tag{9}$$

and $$pO_2(g) = K_8(pCl_2)^{3/2} \tag{10}$$

and $$K_7(pS_2)^{\tfrac{1}{2}} = K_8(pCl_2)^{3/2} \tag{11}$$

When various values of $pS_2$ are substituted in equation (11) the corresponding $pCl_2$ can be calculated assuming a desulfurization temperature of 1300° K. (1880° F.) and 1000° K. (1341° F.). These values shown in Table III show the reduction of $pCl_2$ as the temperature at which the $Cl_2$ is removed from the gas is reduced.

TABLE III

| ppm $H_2S$ | $pCl_2$ (1880° F.) | $pCl_2$ (1341° F.) |
|---|---|---|
| 15000 | $1.08 \times 10^{-6}$ | $1.186 \times 10^{-9}$ |
| 300 | $3.01 \times 10^{-7}$ | $3.280 \times 10^{-10}$ |
| 5 | $7.68 \times 10^{-8}$ | $8.380 \times 10^{-11}$ |

If an Illinois #6 coal is gasified in an oxygen blown gasifier with no in-bed desulfurization the $H_2S$ content is close to 15000 ppm (1.5% $H_2S$) and the chlorine content may be as high as 300 ppm (0.030% $Cl_2$). If that gas is exposed to $CeO_2$, the results shown in Table III above indicate that the $Cl_2$ content is expected to be approximately 1 ppm when in equilibrium with 15,000 ppm $H_2S$, and as the $pH_2S$ decreased the $pCl_2$ would also decrease. It is expected that these levels of $Cl_2$ would meet the requirements of gas turbine manufactures.

If the temperature of desulfurization was lowered to 1000° K. (1341° F.) the $pCl_2$ in equilibrium with 15,000 ppm $H_2S$ would be $7.186 \times 10^{-9}$.

In summary, thermodynamic calculations predict the reduction in $Cl_2$ from fuel gas streams created from Illinois #6 coal even in the presence of 15,000 ppm $H_2S$ at 1880° F. to 1 ppm when $CeO_2$ is used for desulfurization of fuel gases, and to lower levels as the temperature is reduced or as the amount of $H_2S$ present is reduced. The $CeCl_3$ created by this reduction of $Cl_2$ from the fuel gas can be eliminated by exposing the $Ce_2O_2S$-$CeCl_3$ mixture to air at the same temperatures used for regeneration of the $Ce_2O_2S$.

The ability to regenerate any $CeCl_3$ formed when regenerating $Ce_2O_2S$ formed by desulfurization of the gases may be assessed by the partial pressure of chlorine when the regenerating media is air whose $pO_2$ is 0.21. Computations based on equation (6) show that under those conditions the partial pressure of $Cl_2$ is 111.9 atmospheres, which should assure complete regeneration of any $CeCl_3$ formed by exposure of $CeO_2$ to chlorine containing fuel gases. If the temperature of regeneration is above 925° C. there should also be complete regeneration of any $Ce_2O_2S$.

Various embodiments and modifications of this invention have been described in the foregoing description, and further modifications will be apparent to those skilled in the art. Such modifications are included within the scope of the invention as defined by the following claims.

We claim:

1. A process for the removal of chlorine from reducing gases comprising the steps of:
    (a) contacting said reducing gases containing chlorine with cerium oxide to form chlorided cerium oxide;
    (b) removing said chlorided cerium oxide from said reducing gases;
    (c) regenerating cerium oxide by exposing the chlorided cerium oxide to an oxidizing atmosphere to provide cerium oxide which is again capable of reacting with chlorine; and
    (d) returning said regenerated cerium oxide into contact with said reducing gases.

2. The process of claim 1 wherein the temperature is lowered to achieve more complete removal of the chlorine from the reducing gas.

3. The process of claim 1 wherein the reducing power of the gases is increased to achieve more complete removal of chlorine from the reducing gas.

4. The process of claim 1 wherein said reducing gases contain sulfur and said cerium oxide forms chlorided cerium oxide and sulfated cerium oxide upon contact with said reducing gases and said sulfated cerium oxide is removed from said reducing gases and said cerium oxide is regenerated by exposing the sulfated cerium oxide to air.

5. The process of claim 4 wherein the reducing power of the reducing gases is increased to achieve more complete removal of the chlorine from the reducing gas.

6. The process of claim 4 wherein the temperature is lowered to achieve more complete removal of chlorine from the reducing gas.

7. The process of claim 4 wherein the amount of sulfur in the reducing gas is lowered to achieve more complete removal of the chlorine from the reducing gas.

* * * * *

UNITED STATES PATENT AND TRADEMARK OFFICE
CERTIFICATE OF CORRECTION

PATENT NO. : 4,999,174
DATED : March 12, 1991
INVENTOR(S) : WILLIAM G. WILSON, D. ALAN R. KAY It is certified that error appears in the above-identified patent and that said Letters Patent is hereby corrected as shown below:

Column 1, line 59, change "9f" to --of--.

Column 3, line 43, Equation (6), change "CL" to --Cl--.

Signed and Sealed this

Eleventh Day of August, 1992

Attest:

DOUGLAS B. COMER

*Attesting Officer*   *Acting Commissioner of Patents and Trademarks*